(12) United States Patent
Wang et al.

(10) Patent No.: US 9,296,837 B2
(45) Date of Patent: Mar. 29, 2016

(54) COOLING AND PELLETIZING PROCESS FOR SEMI-CRYSTALLINE POLYMERS

(75) Inventors: Yu F. Wang, Houston, TX (US); Cynthia A. Mitchell, Houston, TX (US); Lisa B. V. Venditte, Houston, TX (US); George Rodriguez, Houston, TX (US); Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 715 days.

(21) Appl. No.: 13/466,182

(22) Filed: May 8, 2012

(65) Prior Publication Data

US 2012/0319318 A1 Dec. 20, 2012

Related U.S. Application Data

(60) Provisional application No. 61/498,015, filed on Jun. 17, 2011.

(51) Int. Cl.

| | |
|---|---|
| B29C 47/36 | (2006.01) |
| C08F 6/00 | (2006.01) |
| C08F 6/10 | (2006.01) |
| C08F 6/28 | (2006.01) |
| C08J 3/12 | (2006.01) |
| B29B 9/06 | (2006.01) |

(52) U.S. Cl.
CPC ............... *C08F 6/005* (2013.01); *B29C 47/369* (2013.01); *C08F 6/003* (2013.01); *C08F 6/10* (2013.01); *C08F 6/28* (2013.01); *C08J 3/12* (2013.01); *B29B 9/06* (2013.01); *B29B 9/065* (2013.01); *C08J 2323/14* (2013.01)

(58) Field of Classification Search
None
See application file for complete search history.

(56) References Cited

U.S. PATENT DOCUMENTS

| 4,540,753 A | 9/1985 | Cozewith et al. |
|---|---|---|
| 5,407,266 A | 4/1995 | Dotsch et al. |

(Continued)

FOREIGN PATENT DOCUMENTS

| CN | 101111558 | 1/2008 |
|---|---|---|
| CN | 101213244 | 7/2008 |

(Continued)

OTHER PUBLICATIONS

Cheng, "$^{13}$C NMNR Analysis of Ethylene-Propylene Rubbers", Macromolecules, 1984, vol. 17, pp. 1950-1955.

(Continued)

*Primary Examiner* — Edmund Lee
(74) *Attorney, Agent, or Firm* — Priya G. Prasad

(57) ABSTRACT

Methods and systems for pelletizing low molecular weight semi-crystalline polymers are provided herein. Polymer compositions comprising the semi-crystalline polymer and a solvent are provided to a devolatilizing device, where the solvent is at least partially evaporated under vacuum conditions, resulting in removal of heat from the polymer by evaporative cooling and crystallization of the polymer. Once the polymer has reached the desired temperature, the polymer exits the devolatilizer and is pelletized. Semi-crystalline polymers that may be used in the present invention include propylene-based copolymers, such as propylene-ethylene and propylene-hexene copolymers having a heat of fusion, Hf, from about 5 to about 75 J/g and a weight average molecular weight, Mw, from about 10,000 to about 200,000 g/mol.

16 Claims, 11 Drawing Sheets

(56) References Cited

U.S. PATENT DOCUMENTS

| | | | |
|---|---|---|---|
| 5,630,945 A * | 5/1997 | Takayanagi | C08J 3/095 |
| | | | 210/192 |
| 6,150,498 A | 11/2000 | Abel, Jr. et al. | |
| 6,525,157 B2 | 2/2003 | Cozewith et al. | |
| 6,635,715 B1 | 10/2003 | Datta et al. | |
| 6,881,800 B2 | 4/2005 | Friedersdorf | |
| 7,033,152 B2 | 4/2006 | Eloo et al. | |
| 7,226,553 B2 | 6/2007 | Jackson et al. | |
| 7,470,118 B2 | 12/2008 | Fukutani et al. | |
| 7,601,666 B2 | 10/2009 | Rix et al. | |
| 7,762,712 B2 | 7/2010 | Fleury | |
| 2004/0236042 A1 | 11/2004 | Datta et al. | |
| 2006/0183861 A1 * | 8/2006 | Harrington | C08L 23/142 |
| | | | 525/191 |
| 2006/0247331 A1 | 11/2006 | Coffey et al. | |
| 2009/0121372 A1 | 5/2009 | Campbell et al. | |
| 2009/0192631 A9 | 7/2009 | Fleury et al. | |
| 2010/0152396 A1 | 6/2010 | Fleury et al. | |
| 2011/0172383 A1 | 7/2011 | Yeh et al. | |

FOREIGN PATENT DOCUMENTS

| | | |
|---|---|---|
| GB | 1202544 | 8/1970 |
| GB | 1459158 | 12/1976 |
| JP | 2011-074373 | 4/2011 |
| WO | WO 2004/058480 | 7/2004 |
| WO | WO 2006/083515 | 8/2006 |
| WO | WO 2011/008955 | 1/2011 |
| WO | WO 2011/087731 | 7/2011 |

OTHER PUBLICATIONS

VerStrate et al., "Near Monodisperse Ethylene-Propylene Copolymers by Direct Ziegler-Natta Polymerization, Preparation, Characterization, Properties", Macromolecules, 1988, vol. 21, pp. 3360-3371.

Wheeler et al. "Gel Permeation Chromatography/Fourier Transform Infrared Interface for Polymer Analysis", Applied Spectroscopy, 1993, vol. 47, pp. 1128-1130.

Everitt, The Cambridge Dictionary of Statistics, $2^{nd}$ Edition, 2002.

Polymer Handbook, Fourth Edition, 1999, John Wiley and Sons, Inc.

* cited by examiner

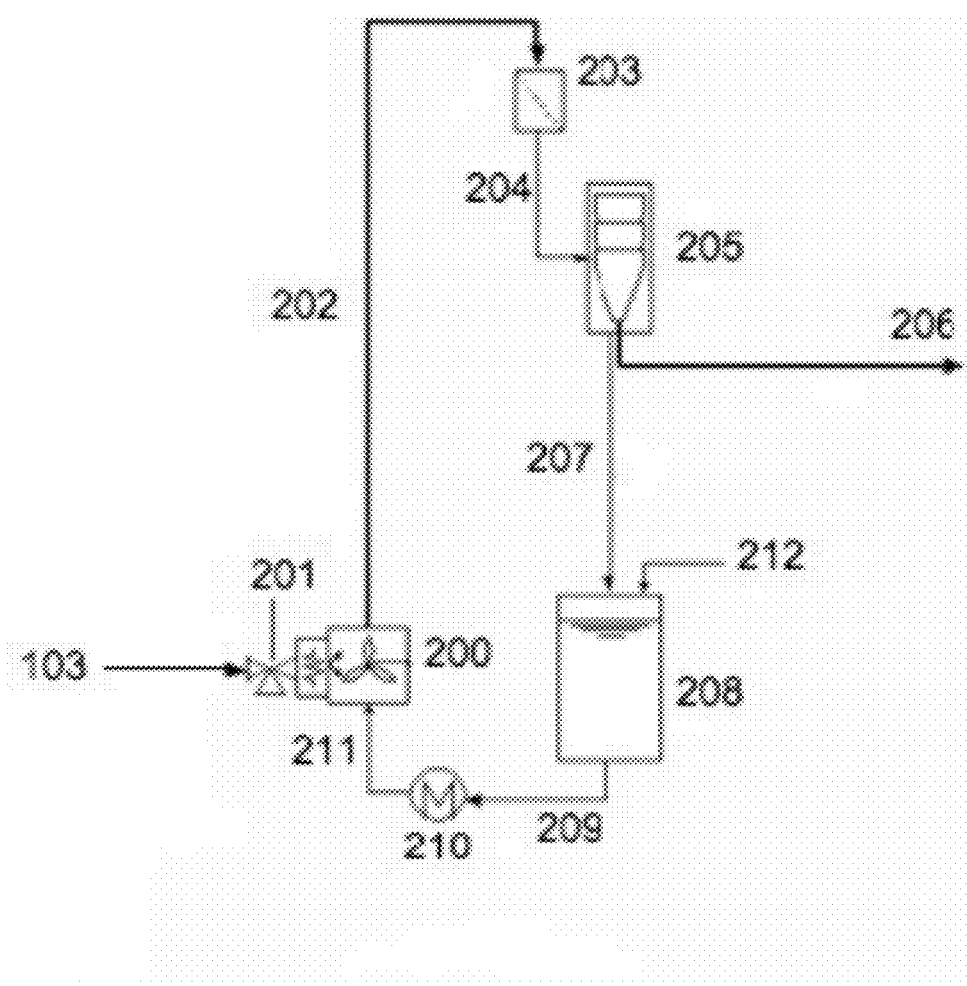

Polymer A

Polymer B

Polymer C

Polymer A

Polymer A

Polymer C

COOLING AND PELLETIZING PROCESS FOR SEMI-CRYSTALLINE POLYMERS

PRIORITY CLAIM

This application claims the benefit of and priority to U.S. Patent Application Ser. No. 61/498,015, filed Jun. 17, 2011, which is incorporated by reference herein in its entirety.

BACKGROUND OF THE INVENTION

Olefin based polymers are widely used in various applications because they are chemically inert, have a low density, and are cost effective. Applications include, for example, adhesives, films, fibers, molded parts, and combinations thereof. While these polymers are solid at room temperature, they are often produced and processed as melts. The last step in many manufacturing processes for such materials is converting the polymer melt into easily handled granules. Granules—pellets being one type—are advantageous as they can be easily packaged, transported, weighed, batched, and reprocessed.

Granulation, or pelletization, may be achieved in a variety of ways. For low viscosity materials (i.e., those polymers having a viscosity less than 100 cP at 190° C. and determined according to ASTM D-3236), the polymer melt is applied onto a cooling surface, the melt is cooled into a solid, and the solid is recovered as flakes, pastilles, briquettes, granules, or other suitable forms. Often, however, the granulation step is skipped altogether for low viscosity melts, and the melts are packaged in transportable melt tanks. For higher viscosity polymers, granulation generally involves forcing the polymer melt through a die and cooling and cutting the resulting strands into pellets. When these higher viscosity polymers have suitably high molecular weights, it is possible to make clean cuts resulting in discrete, commercially acceptable pellets at a wide range of processing temperatures.

For certain lower viscosity polymers, however, acceptable pellets are only formed at relatively low temperatures. Previously, these low temperatures were achieved by processing the polymers in surface-cooled extruders, which are able to cool the polymer melt through the metal housing of an extruder using a circulated refrigerant. For large volume industrial processes, however, this method is not feasible because the amount of heat that needs to be removed from the polymer to obtain acceptable pellets is directly proportional to the amount of polymer, while the amount of heat that can actually be removed is proportional to the surface area of the extruder. Because the former depends upon volume (and the cube of linear dimensions) while the latter depends upon area (and the square of linear dimensions), scaling up for larger processes requires either very long periods of cooling time or multiple smaller extruders in series to handle the larger volume of polymer material.

It would be desirable, then, to develop a more efficient method for cooling low viscosity polymers so that the polymers can be pelletized. The present invention addresses these issues by providing a method for evaporative cooling of low viscosity, semi-crystalline polymers by removing solvent in a vacuum assisted devolatilization device for a time sufficient to allow substantially complete crystallization of the polymers.

SUMMARY OF THE INVENTION

The present invention relates to methods and systems for pelletizing relatively low viscosity semi-crystalline polymers by supplying a molten polymer composition comprising the semi-crystalline polymer and a solvent to a devolatilizing device. In the devolatilizer, the solvent is at least partially evaporated under vacuum conditions, resulting in both removal of heat from the polymer by evaporative cooling and crystallization of the polymer. Additional heat may be optionally removed by external and/or internal refrigeration of the walls or stirrer shaft of the devolatilizing device. Once the polymer has reached the desired temperature and level of crystallization, which will vary depending upon the polymer but are generally determined by the relationship between the temperature of the polymer at the outlet of the devolatilizer and the polymer's crystallization temperature, the polymer exits the devolatilizer and is pelletized. In some instances, the desired level of crystallization may be such that the polymer is able to be extruded into strands and pelletized using an intermittent knife. Semi-crystalline polymers suitable for use in the present invention include polymers comprising contiguous ethylene or meso propylene units. An example of the latter are propylene-based copolymers comprising one or more $C_2$ and/or $C_4$-$C_{12}$ alpha-olefins, such as for example propylene-ethylene and propylene-hexene copolymers having a heat of fusion, Hf, from about 5 to about 75 J/g, a viscosity from about 50 cP to about 20,000 cP at 190° C., and a weight average molecular weight, Mw, from about 10,000 to about 200,000 g/mol.

BRIEF DESCRIPTION OF THE DRAWINGS

FIG. 2 depicts an illustrative pelletizing device suitable for use in the inventive processes and systems.

DETAILED DESCRIPTION OF THE INVENTION

Figure 1:
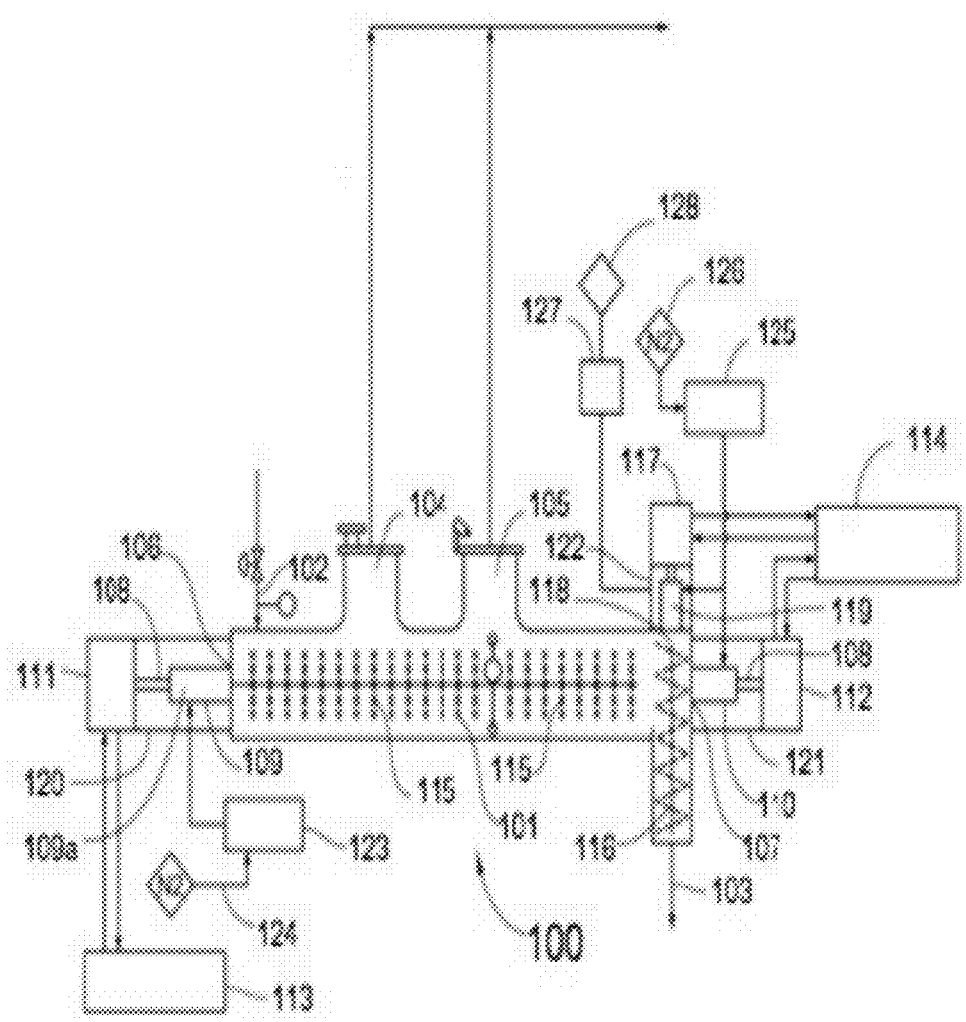
FIG. 1 depicts an illustrative devolatilizing device suitable for use in the inventive processes and systems.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The present invention relates to methods and systems for pelletizing relatively low viscosity semi-crystalline polymers by supplying a molten polymer composition comprising the semi-crystalline polymer and a solvent to a devolatilizing device. In the devolatilizer, the solvent is at least partially evaporated under vacuum conditions, resulting in both removal of heat from the polymer by evaporative cooling and crystallization of the polymer. Both of these processes lead to an increase in the viscosity of the polymer. Further, the polymer melt within the devolatilizer is agitated in a low shear environment so that the cooling process is not reversed or otherwise affected by viscous heating of the melt due to shear.

Once the polymer has reached the desired temperature and level of crystallization, which will vary depending upon the polymer but are generally determined by the relationship between the temperature of the polymer at the outlet of the devolatilizer and the polymer's crystallization temperature as described in further detail below, the polymer exits the devolatilizer and is pelletized. The object of the invention is to control the cooling and crystallization of the polymer such that viscosity of the polymer melt exiting the devolatilizer is such that the polymer is mobile enough to be extruded, while ensuring that the polymer remains substantially viscous so that it can be extruded, pelletized, and transferred while retaining its shape. Acceptable pelletization is possible due to higher than expected viscosity of the polymer due to crystallization.

In one or more embodiments, the present invention relates to a process for pelletizing a semi-crystalline polymer that comprises providing a vessel having an inlet and an outlet, such as a devolatilizing vessel of the type described below, introducing a first polymer composition comprising a semi-crystalline polymer and a solvent into the inlet of the vessel, and subjecting the first polymer composition to a vacuum in the vessel such that at least a portion of the solvent is removed from the first polymer composition and the temperature of the first polymer composition is reduced, resulting in a second polymer composition comprising the semi-crystalline polymer and having a lower solvent content and a lower temperature than the first polymer composition.

In such processes, the optimal amount of solvent in the first polymer composition will generally be dependent upon the desired temperature change of the polymer melt within the devolatilizer, and can be readily determined by persons of skill in the art. For example, in some embodiments the first polymer composition may comprise from about 1 wt % to about 50 wt % solvent, or from about 5 wt % to about 45 wt % solvent, or from about 10 wt % to about 40 wt % solvent. The amount of solvent in the first polymer composition may be specified within limits such that essentially complete evaporation of the solvent is achieved in the devolatilizer using residual heat in the first polymer composition. In certain embodiments of the invention, after evaporation of solvent within the devolatilizer the second polymer composition comprises a negligible amount of residual solvent. As used herein, a "negligible amount" means that the second polymer composition comprises less than about 5 wt % residual solvent. Preferably, the second polymer composition comprises less than about 2 wt %, or less than about 1 wt %, or less than about 5000 ppm, or less than about 2000 ppm, or less than about 1000 ppm, or less than about 500 ppm, or less than about 300 ppm, or less than about 100 ppm, or less than about 50 ppm, or less than about 30 ppm, or less than about 10 ppm residual solvent. Both the amount of solvent used and the type of solvent may be chosen such that the desired extent of solvent removal may be attained within the residence time of the polymer in the devolatilizer. Considerations may include, but are not limited to, the vapor pressure of the solvent under the conditions of the devolatilizer, the latent heat of vaporization of the solvent, the temperature in the devolatilizer, and the level of vacuum within the devolatilizer.

Further, in one or more embodiments of the invention, the amount of solvent used in the first polymer composition is such that the second polymer composition reaches a predetermined temperature at the outlet of the devolatilization vessel (Tf) due to the cooling associated with the latent heat of vaporization of the solvent while in the vessel. For example, the amount of solvent may be determined according to the relation $$X = 100 * C_p(T_1 - T_f)/\Delta H_{vap},$$

where X is parts of solvent per 100 parts of the first polymer, $T_1$ is the initial temperature of the first polymer composition (in ° C.), Tf is the temperature of the second polymer composition at the outlet of the devolatilization vessel (in ° C.), Cp is the average heat capacity of the second polymer composition between the temperatures $T_1$ and Tf (in J/° C.), and $\Delta H_{vap}$ is the heat of vaporization of the solvent between temperatures $T_1$ and Tf (in J/g). In cases where supplemental cooling occurs because of heat transfer from the external walls or stirrer shaft of the devolatilizer, the amount of solvent may be adjusted accordingly.

The desired temperature of the second polymer composition at the inlet and the outlet of the devolatilizer ($T_1$ and Tf, respectively) can be chosen such that the viscosities of the second polymer compositions are maintained within a desired range. The viscosity of the compositions changes with temperature; typically lower temperatures lead to higher viscosity. In one or more embodiments of the invention, $T_1$ is chosen such that the viscosity of the first polymer composition (which comprises a semi-crystalline polymer and solvent) at or near the inlet of the devolatilizer is from about 50 to about 20,000 cP and the viscosity of the second polymer composition at or near the exit of the devolatilizer is from about 20,000 to about 100,000 cP. In the same or other embodiments, the viscosity of the first polymer composition at the inlet of the devolatilizer is from about 10 to about 20,000 cP, or from about 100 to about 15,000 cP, or from about 100 to about 10,000 cP, or from about 100 to about 7,500 cP, or from about 100 to about 5,000 cP, or from about 100 to about 4,000 cP, or from about 100 to about 3,000 cP, or from about 100 to about 2,000 cP, or from about 100 to about 1,500 cP, or from about 100 to about 1,000 cP, and the viscosity of the second polymer composition at the exit of the devolatilizer is from about 5,000 to about 500,000 cP, or from about 7,500 to about 300,000 cP, or from about 10,000 to about 200,000 cP, or from about 20,000 to about 100,000 cP, or from about 25,000 to about 90,000 cP, or from about 30,000 to about 80,000 cP.

In the processes described herein, the optimal temperature of the second polymer composition at the outlet of the devolatilization vessel (Tf) can also be related to the first crystallization temperature of the semi-crystalline polymer (Tc1), where all temperatures are in degrees Celsius. In one or more embodiments of the invention, the desired Tf will be determined such that the relationship between Tf and Tc1 satisfies the formula Tf≤Tc1+60. The relationship between Tf and Tc1 may further satisfy the formula Tf≤Tc1+50, or Tf≤Tc1+40, or Tf≤Tc1+35, or Tf≤Tc1+30, or Tf≤Tc1+25, or Tf≤Tc1+20, or Tf≤Tc1+15, or Tf≤Tc1+10, or Tf≤Tc1+5. In the same or other embodiments, the relationship between Tf and Tc1 may satisfy the formula Tc1−30≤Tf≤Tc1+30, or Tc1−25≤Tf≤Tc1+25, or Tc1−20≤Tf≤Tc1+20, or Tc1−15≤Tf≤Tc1+15, or Tc1−10≤Tf≤Tc1+10. Alternately, the relationship between Tf and Tc1 may satisfy the formula Tc1≤Tf≤Tc1+60, or Tc1≤Tf≤Tc1+50, or Tc1≤Tf≤Tc1+40, or Tc1≤Tf≤Tc1+35, or Tc1≤Tf≤Tc1+30, or Tc1≤Tf≤Tc1+25, or Tc1≤Tf≤Tc1+20. Further, the relationship between Tf and Tc1 may satisfy the formula Tc1−20≤Tf≤Tc1+60, or Tc1−20≤Tf≤Tc1+50, or Tc1−15≤Tf≤Tc1+40, or Tc1−15≤Tf≤Tc1+35, or Tc1−10≤Tf≤Tc1+30, or Tc1−10≤Tf≤Tc1+25, or Tc1−5≤Tf≤Tc1+20.

In the processes described herein, the optimal temperature of the second polymer composition at the outlet of the devolatilization vessel (Tf) can also be related to the second crystallization temperature of the semi-crystalline polymer (Tc2), where all temperatures are in degrees Celsius. In one or more embodiments of the invention, the desired Tf will be determined such that the relationship between Tf and Tc2 satisfies the formula $Tf \leq Tc2+100$. The relationship between Tf and Tc2 may further satisfy the formula $Tf \leq Tc2+90$, or $Tf \leq Tc2+85$, or $Tf \leq Tc2+80$, or $Tf \leq Tc2+75$, or $Tf \leq Tc2+70$, or $Tf \leq Tc2+65$, or $Tf \leq Tc2+60$, or $Tf \leq Tc2+50$, or $Tf \leq Tc2+40$, or $Tf \leq Tc2+30$, or $Tf \leq Tc2+20$, or $Tf \leq Tc2+10$. In the same or other embodiments, the relationship between Tf and Tc2 may satisfy the formula $Tc2-30 \leq Tf \leq Tc2+90$, or $Tc2-25 \leq Tf \leq Tc2+80$, or $Tc2-20 \leq Tf \leq Tc2+70$, or $Tc2-15 \leq Tf \leq Tc2+60$, or $Tc2-10 \leq Tf \leq Tc2+50$, or $Tc2-10 \leq Tf \leq Tc2+40$, or $Tc2-10 \leq Tf \leq Tc2+30$. Alternately, the relationship between Tf and Tc2 may satisfy the formula $Tc2 \leq Tf \leq Tc2+90$, or $Tc2 \leq Tf \leq Tc2+80$, or $Tc2 \leq Tf \leq Tc2+70$, or $Tc2 \leq Tf \leq Tc2+60$, or $Tc2 \leq Tf \leq Tc2+50$, or $Tc2 \leq Tf \leq Tc2+40$, or $Tc2 \leq Tf \leq Tc2+30$. Further, the relationship between Tf and Tc2 may satisfy the formula $Tc2-20 \leq Tf \leq Tc2+90$, or $Tc2-20 \leq Tf \leq Tc2+80$, or $Tc2-15 \leq Tf \leq Tc2+70$, or $Tc2-15 \leq Tf \leq Tc2+60$, or $Tc2-10 \leq Tf \leq Tc2+50$, or $Tc2-10 \leq Tf \leq Tc2+40$, or $Tc2-5 \leq Tf \leq Tc2+30$.

The process further comprises discharging the second polymer composition from the outlet of the vessel, supplying the second polymer composition to a pelletizer comprising an extruder and a pelletizing die, and discharging a pelletized polymer product from the pelletizer. In some embodiments, the pelletizer is an underwater pelletizer of the type and operation described in detail below and illustrated in FIG. 2. In certain embodiments, the pelletizing die of the pelletizer may be heated or cooled so as to maintain the melt temperature (and therefore viscosity) of the polymer melt for optimum pelletizing.

In the processes described herein, the optimal temperature of the second polymer composition at the outlet of the pelletizing die (Td) can also be related to the first crystallization temperature of the semi-crystalline polymer (Tc1), where all temperatures are in degrees Celsius. In one or more embodiments of the invention, the desired Td will be determined such that the relationship between Td and Tc1 satisfies the formula $Tc1-60 \leq Td \leq Tc1+60$. The relationship between Td and Tc1 may further satisfy the formula $Tc1-50 \leq Td \leq Tc1+50$, or $Tc1-40 \leq Td \leq Tc1+40$, or $Tc1-35 \leq Td \leq Tc1+35$, or $Tc1-30 \leq Td \leq Tc1+30$, or $Tc1-25 \leq Td \leq Tc1+25$, or $Tc1-20 \leq Td \leq Tc1+20$, or $Tc1-15 \leq Td \leq Tc1+15$, or $Tc1-10 \leq Td \leq Tc1+10$, or $Tc1-5 \leq Td \leq Tc1+5$.

In one or more embodiments, the devolatilizing vessel may further comprise at least one vacuum port and at least one stirrer shaft port, a stirrer shaft passing through the at least one stirrer shaft port, a stirrer shaft seal associated with each stirrer shaft port for sealing against the stirrer shaft, and at least one motor located outside the vessel for rotating the stirrer shaft. In certain of these embodiments, the stirrer shaft may have an external portion outside of the vessel and an internal portion extending into the vessel, wherein the internal portion of the stirrer shaft comprises an agitating means, such as paddles or blades. In one or more embodiments, the walls of the vessel or the stirrer shaft, or both, may be cooled (such as by circulation of refrigerated liquid) to provide additional cooling of the polymer within the vessel.

In some embodiments, the present invention further relates to a process for pelletizing a semi-crystalline polymer that comprises providing a devolatilizer having an inlet and an outlet, providing a polymer composition comprising a semi-crystalline polymer and a solvent to the inlet of the devolatilizer, conveying the polymer composition through the devolatilizer from the inlet to the outlet, removing the polymer composition from the outlet of the devolatilizer, and pelletizing the composition. In certain embodiments, the composition may be pelletized using an underwater pelletizer. The process may further comprise creating a vacuum to remove at least a portion of the solvent from the polymer composition by evaporation and such that the temperature of the polymer composition at the outlet of the devolatilizer is lower than the temperature of the polymer composition at the inlet of the devolatilizer. In further embodiments, the temperature of the polymer composition at the outlet of the vessel (Tf) may be at least about 5° C., or at least about 10° C., or at least about 15° C., or at least about 20° C., or at least about 25° C., or at least about 30° C. lower than the temperature of the polymer composition at the inlet ($T_1$) of the vessel.

In the same or other embodiments, the polymer composition removed from the devolatilizer comprises less than or equal to about 1 wt % solvent, and the relationship between the temperature of the polymer composition at the outlet of the vessel (Tf) and the first crystallization temperature of the semi-crystalline polymer (Tc1) satisfies the formula $Tf \leq Tc1+60$. The relationship between Tf and Tc1 may further satisfy the formula $Tf \leq Tc1+50$, or $Tf \leq Tc1+40$, or $Tf \leq Tc1+35$, or $Tf \leq Tc1+30$, or $Tf \leq Tc1+25$, or $Tf \leq Tc1+20$, or $Tf \leq Tc1+15$, or $Tf \leq Tc1+10$, or $Tf \leq Tc1+5$. In the same or other embodiments, the relationship between Tf and Tc1 may satisfy the formula $Tc1-30 \leq Tf \leq Tc1+30$, or $Tc1-25 \leq Tf \leq Tc1+25$, or $Tc1-20 \leq Tf \leq Tc1+20$, or $Tc1-15 \leq Tf \leq Tc1+15$, or $Tc1-10 \leq Tf \leq Tc1+10$. Alternately, the relationship between Tf and Tc1 may satisfy the formula $Tc1 \leq Tf \leq Tc1+60$, or $Tc1 \leq Tf \leq Tc1+50$, or $Tc1 \leq Tf \leq Tc1+40$, or $Tc1 \leq Tf \leq Tc1+35$, or $Tc1 \leq Tf \leq Tc1+30$, or $Tc1 \leq Tf \leq Tc1+25$, or $Tc1 \leq Tf \leq Tc1+20$. Further, the relationship between Tf and Tc1 may satisfy the formula $Tc1-20 \leq Tf \leq Tc1+60$, or $Tc1-20 \leq Tf \leq Tc1+50$, or $Tc1-15 \leq Tf \leq Tc1+40$, or $Tc1-15 \leq Tf \leq Tc1+35$, or $Tc1-10 \leq Tf \leq Tc1+30$, or $Tc1-10 \leq Tf \leq Tc1+25$, or $Tc1-5 \leq Tf \leq Tc1+20$.

In the same or other embodiments, the polymer composition removed from the devolatilizer comprises less than or equal to about 1 wt % solvent, and the relationship between the temperature of the polymer composition at the outlet of the vessel (Tf) and the second crystallization temperature of the semi-crystalline polymer (Tc2) satisfies the formula $Tf \leq Tc2+60$. The relationship between Tf and Tc2 may further satisfy the formula $Tf \leq Tc2+50$, or $Tf \leq Tc2+40$, or $Tf \leq Tc2+35$, or $Tf \leq Tc2+30$, or $Tf \leq Tc2+25$, or $Tf \leq Tc2+20$, or $Tf \leq Tc2+15$, or $Tf \leq Tc2+10$, or $Tf \leq Tc2+5$. In the same or other embodiments, the relationship between Tf and Tc2 may satisfy the formula $Tc2-30 \leq Tf \leq Tc2+30$, or $Tc2-25 \leq Tf \leq Tc2+25$, or $Tc2-20 \leq Tf \leq Tc2+20$, or $Tc2-15 \leq Tf \leq Tc2+15$, or $Tc2-10 \leq Tf \leq Tc2+10$. Alternately, the relationship between Tf and Tc2 may satisfy the formula $Tc2 \leq Tf \leq Tc2+60$, or $Tc2 \leq Tf \leq Tc2+50$, or $Tc2 \leq Tf \leq Tc2+40$, or $Tc2 \leq Tf \leq Tc2+35$, or $Tc2 \leq Tf \leq Tc2+30$, or $Tc2 \leq Tf \leq Tc2+25$, or $Tc2 \leq Tf \leq Tc2+20$. Further, the relationship between Tf and Tc2 may satisfy the formula $Tc2-20 \leq Tf \leq Tc2+60$, or $Tc2-20 \leq Tf \leq Tc2+50$, or $Tc2-15 \leq Tf \leq Tc2+40$, or $Tc2-15 \leq Tf \leq Tc2+35$, or $Tc2-10 \leq Tf \leq Tc2+30$, or $Tc2-10 \leq Tf \leq Tc2+25$, or $Tc2-5 \leq Tf \leq Tc2+20$.

In one or more embodiments, the invention additionally relates to one or more systems for pelletizing a polymer composition. The system comprises a devolatilizing vessel having a polymer inlet for introducing a first polymer composition to the vessel and a polymer outlet for discharging a second polymer composition, a devolatilizing region within the vessel having a solvent outlet for removing solvent from the first polymer composition to form the second polymer composition, a stirrer shaft passing longitudinally through the vessel for agitating the contents of the vessel, a motor located outside the vessel for rotating the stirrer shaft, and a pelletizer for pelletizing the second polymer composition upon exiting the vessel. In one or more embodiments, the solvent outlet may be a single solvent outlet or multiple solvent outlets, and each outlet may be a vacuum port. In the same or other embodiments, the system may further comprise a polymer discharge screw located between the polymer outlet of the vessel and the pelletizer. In one or more embodiments, the pelletizer may be an underwater pelletizer.

In such systems, the optimal amount of solvent in the first polymer composition will generally be dependent upon the desired temperature change of the polymer melt within the devolatilizer, and can be determined by persons of skill in the art as previously described. For example, the first polymer composition may comprise from about 1 wt % to about 50 wt % solvent, or from about 5 wt % to about 45 wt % solvent, or from about 10 wt % to about 40 wt % solvent. After evaporation of solvent within the devolatilizer, the second polymer composition will generally comprise a negligible amount of residual solvent, as previously defined. For example, the second polymer composition comprises less than about 5 wt %, or less than about 2 wt %, or less than about 1 wt %, or less than about 5000 ppm, or less than about 2000 ppm, or less than about 1000 ppm, or less than about 500 ppm, or less than about 300 ppm, or less than about 100 ppm, or less than about 50 ppm, or less than about 30 ppm, or less than about 10 ppm residual solvent. The temperature of the second polymer composition at the outlet of the vessel is lower than the temperature of the first polymer composition at the inlet of the vessel, and the conditions within the devolatilizing region of the vessel are such that a vacuum is maintained to facilitate removal of at least a portion of the solvent from the first polymer composition by evaporation. In further embodiments, the temperature of the second polymer composition at the outlet of the vessel (Tf) may be at least about 5° C., or at least about 10° C., or at least about 15° C., or at least about 20° C., or at least about 25° C., or at least about 30° C. lower than the temperature of the first polymer composition ($T_1$) at the inlet of the vessel.

In the same or other embodiments of systems according to the invention, the relationship between the temperature of the second polymer composition at the outlet of the vessel (Tf) and the first crystallization temperature of the semi-crystalline polymer (Tc2) satisfies the formula Tf≤Tc1+60. The relationship between Tf and Tc1 may further satisfy the formula Tf≤Tc1+50, or Tf≤Tc1+40, or Tf≤Tc1+35, or Tf≤Tc1+30, or Tf≤Tc1+25, or Tf≤Tc1+20, or Tf≤Tc1+15, or Tf≤Tc1+10, or Tf≤Tc1+5. In the same or other embodiments, the relationship between Tf and Tc2 may satisfy the formula Tc1−30≤Tf≤Tc1+30, or Tc1−25≤Tf≤Tc1+25, or Tc1−20≤Tf≤Tc1+20, or Tc1−15≤Tf≤Tc1+15, or Tc1−10≤Tf≤Tc1+10. Alternately, the relationship between Tf and Tc1 may satisfy the formula Tc1≤Tf≤Tc1+60, or Tc1≤Tf≤Tc1+50, or Tc1≤Tf≤Tc1+40, or Tc1≤Tf≤Tc1+35, or Tc1≤Tf≤Tc1+30, or Tc1≤Tf≤Tc1+25, or Tc1≤Tf≤Tc1+20. Further, the relationship between Tf and Tc1 may satisfy the formula Tc1−20≤Tf≤Tc2+60, or Tc1−20≤Tf≤Tc1+50, or Tc1−15≤Tf≤Tc1+40, or Tc1−15≤Tf≤Tc1+35, or Tc1−10≤Tf≤Tc1+30, or Tc1−10≤Tf≤Tc1+25, or Tc1−5≤Tf≤Tc1+20.

In the same or other embodiments of systems according to the invention, the relationship between the temperature of the second polymer composition at the outlet of the vessel (Tf) and the crystallization temperature of the semi-crystalline polymer (Tc2) satisfies the formula Tf≤Tc2+60. The relationship between Tf and Tc2 may further satisfy the formula Tf≤Tc2+50, or Tf≤Tc2+40, or Tf≤Tc2+35, or Tf≤Tc2+30, or Tf≤Tc2+25, or Tf≤Tc2+20, or Tf≤Tc2+15, or Tf≤Tc2+10, or Tf≤Tc2+5. In the same or other embodiments, the relationship between Tf and Tc2 may satisfy the formula Tc2−30≤Tf≤Tc2+30, or Tc2−25≤Tf≤Tc2+25, or Tc2−20≤Tf≤Tc2+20, or Tc2−15≤Tf≤Tc2+15, or Tc2−10≤Tf≤Tc2+10. Alternately, the relationship between Tf and Tc2 may satisfy the formula Tc2≤Tf≤Tc2+60, or Tc2≤Tf≤Tc2+50, or Tc2≤Tf≤Tc2+40, or Tc2≤Tf≤Tc2+35, or Tc2≤Tf≤Tc2+30, or Tc2≤Tf≤Tc2+25, or Tc2≤Tf≤Tc2+20. Further, the relationship between Tf and Tc2 may satisfy the formula Tc2−20≤Tf≤Tc2+60, or Tc2−20≤Tf≤Tc2+50, or Tc2−15≤Tf≤Tc2+40, or Tc2−15≤Tf≤Tc2+35, or Tc2−10≤Tf≤Tc2+30, or Tc2−10≤Tf≤Tc2+25, or Tc2−5≤Tf≤Tc2+20.

Semi-Crystalline Polymers

Polymers suitable for use in the present invention are semi-crystalline polymers having a relatively low molecular weight and a relatively broad melting curve (such that the viscosity of the polymer changes slowly as the temperature of the polymer changes). The term "polymer" as used herein includes, but is not limited to, homopolymers, copolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers.

The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, ethylene monomers, and diene monomers.

"Polypropylene" as used herein includes homopolymers and copolymers of propylene or mixtures thereof. Products that include one or more propylene monomers polymerized with one or more additional monomers may be more commonly known as random copolymers (RCP) or impact copolymers (ICP). Impact copolymers are also known in the art as heterophasic copolymers. "Propylene-based," as used herein, is meant to include any polymer comprising propylene, either alone or in combination with one or more comonomers, in which propylene is the major component (i.e., greater than 50 wt % propylene).

In certain embodiments of the present invention, the semi-crystalline polymer may comprise one or more propylene-based polymers, which comprise propylene and from about 5 wt % to about 30 wt % of one or more comonomers selected from $C_2$ and/or $C_4$-$C_{12}$ α-olefins. In one or more embodiments, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In one or more embodiments, the semi-crystalline polymer may include at least about 5 wt %, at least about 6 wt %, at least about 7 wt %, or at least about 8 wt %, or at least about 10 wt %, or at least about 12 wt % ethylene-derived or hexene-derived units. In those or other embodiments, the copolymers may include up to about 30 wt %, or up to about 25 wt %, or up to about 22 wt %, or up to about 20 wt %, or up to about 19 wt %, or up to about 18 wt %, or up to about 17 wt % ethylene-derived or hexene-derived units, where the percentage by weight is based upon the total weight of the propylene-derived and α-olefin derived units. Stated another way, the propylene-based polymer may include at least about 70 wt %, or at least about 75 wt %, or at least about 80 wt %, or at least about 81 wt % propylene-derived units, or at least about 82 wt % propylene-derived units, or at least about 83 wt % propylene-derived units; and in these or other embodiments, the copolymers may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and alpha-olefin derived units. In certain embodiments, the propylene-based polymer may comprise from about 5 wt % to about 25 wt % ethylene-derived or hexene-derived units, or from about 8 wt % to about 20 wt % ethylene-derived or hexene-derived units, or from about 12 wt % to about 18 wt % ethylene-derived or hexene-derived units.

The semi-crystalline polymers of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments, the Tm of the semi-crystalline polymer (as determined by DSC) is less than about 115° C., or less than about 110° C., or less than about 100° C., or less than about 90° C. In the same or other embodiments, the Tm of the semi-crystalline polymer is greater than about 25° C., or greater than about 30° C., or greater than about 35° C., or greater than about 40° C.

In one or more embodiments, the first crystallization temperature (Tc1) of the semi-crystalline polymer (as determined by viscosity curve) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc1 of the semi-crystalline polymer is greater than about 0° C., or greater than about 5° C., or greater than about 10° C., or greater than about 15° C., or greater than about 20° C.

In other embodiments, the Tc1 lower limit of the semi-crystalline polymer may be 0° C., 5° C., 10° C., 20° C., 30° C., 40° C., 50° C., 60° C., and 70° C.; and the Tc1 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the second crystallization temperature (Tc2) of the semi-crystalline polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the semi-crystalline polymer is greater than about 0° C., or greater than about 5° C., or greater than about 10° C., or greater than about 15° C., or greater than about 20° C.

In other embodiments, the Tc2 lower limit of the semi-crystalline polymer may be 0° C., 5° C., 10° C., 20° C., 30° C., 40° C., 50° C., 60° C., and 70° C.; and the Tc2 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the semi-crystalline polymer may be characterized by its heat of fusion (Hf), as determined by DSC. In one or more embodiments, the semi-crystalline polymer may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. In these or other embodiments, the semi-crystalline polymer may be characterized by an Hf of less than about 80 J/g, or less than about 75 J/g, or less than about 70 J/g, or less than about 60 J/g, or less than about 50 J/g, or less than about 45 J/g.

In other embodiments, the heat of fusion (Hf) lower limit of the semi-crystalline polymer may be 1.0 J/g, 2.0 J/g, 3.0 J/g, 4.0 J/g, 5.0 J/g, 10.0 J/g, 15.0 J/g, 20.0 J/g, 25.0 J/g, and 30.0 J/g; and the upper limit Hf may be 70.0 J/g, 60.0 J/g, 50.0 J/g, 45.0 J/g, 40.0 J/g, 35.0 J/g, 30.0 J/g, 25.0 J/g, 20.0 J/g, 15.0 J/g, and 10.0 J/g with ranges from any lower limit to any upper limit being contemplated.

The polymers suitable for use herein are said to be "semi-crystalline," meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers or sequences that are mainly amorphous in the undeformed state, but upon stretching or annealing, become crystalline. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a triad tacticity of three propylene units, as measured by $^{13}$C NMR, of 75% or greater, 80% or greater, 85% or greater, 90% or greater, 92% or greater, 95% or greater, or 97% or greater. In one or more embodiments, the triad tacticity may range from about 75% to about 99%, or from about 80% to about 99%, or from about 85% to about 99%, or from about 90% to about 99%, or from about 90% to about 97%, or from about 80% to about 97%. Triad tacticity is determined by the methods described in U.S. Patent Application Publication No. 2004/0236042.

The semi-crystalline polymer may have a tacticity index m/r ranging from a lower limit of 4 or 6 to an upper limit of 8 or 10 or 12. The tacticity index, expressed herein as "m/r", is determined by $^{13}C$ nuclear magnetic resonance ("NMR"). The tacticity index m/r is calculated as defined by H. N Cheng in 17 MACROMOLECULES 1950 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature as measured per the ASTM D-792 test method.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Techniques for determining the molecular weight may be found in U.S. Pat. No. 4,540,753 (Cozewith, Ju and Verstrate) and in Macromolecules, 1988, Vol. 21, p. 3360 (Verstrate et al.). For example, molecular weight may be determined by size exclusion chromatography (SEC) by using a Waters 150 gel permeation chromatograph equipped with the differential refractive index detector and calibrated using polystyrene standards.

In one or more embodiments, the semi-crystalline polymer may have a viscosity (also referred to a brookfield viscosity or melt viscosity), measured at 190° C. and determined according to ASTM D-3236 from about 100 cP to about 1,000,000,000 cP, or from about 1,000 to about 100,000,000 cP, or from about 2,000 to about 10,000,000 cP, or from about 2,500 to about 7,500,000 cP, or from about 3,000 to about 5,000,000 cP, or from about 3,500 to about 3,000,000 cP, or from about 4,000 to about 1,000,000 cP, or from about 4,500 to about 750,000 cP, or from about 5,000 to about 500,000 cP, or from about 5,500 to about 450,000 cP, or from about 6,000 to about 400,000 cP.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by an viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP.

In other embodiments, the viscosity at 190° C. lower limit of the semi-crystalline polymer may be 100 cP, 1,000 cP, 1,500 cP, 2,000 cP, 3,000 cP, 4,000 cP, and 5,000 cP; and the upper limit Hf may be 100,000 cP, 75,000 cP, 50,000 cP, 25,000 cP, 20,000 cP, 15,000 cP, 10,000 cP, and 5,000 cP with ranges from any lower limit to any upper limit being contemplated.

Preparation of Semi-Crystalline Polymers

Polymerization of the semi-crystalline polymers is conducted by reacting monomers in the presence of a catalyst system described herein at a temperature of from 0° C. to 200° C. for a time of from 1 second to 10 hours. Preferably homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods suitable for preparation of the semi-crystalline polymers described herein may be found in U.S. Pat. No. 6,881,800, which is incorporated by reference herein for purposes of U.S. practice.

The triad tacticity and tacticity index of the semi-crystalline polymer may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer will reduce the crystallinity provided by the crystallization of stereoregular propylene derived sequences to the point where the material lacks strength; too little and the material will be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045×2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis.

Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The semi-crystalline polymers described herein are prepared using one or more catalyst systems. As used herein, a "catalyst system" comprises at least a transition metal compound, also referred to as catalyst precursor, and an activator.

Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

In one or more embodiments of the present invention, the catalyst systems used for producing semi-crystalline polymers comprise a metallocene compound. In some embodiments, the metallocene compound is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In_1$ and $In_2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds of this type include, but are not limited to, μ-dimethylsilylbis(indenyl)hafniumdimethyl and μ-dimethylsilylbis(indenyl)zirconiumdimethyl.

In other embodiments, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ are substituted in the 2 position by a methyl group and in the 4 position by a substituent selected from the group consisting of $C_5$ to $C_{15}$ aryl, $C_6$ to $C_{25}$ alkylaryl, and N- or P-containing alkyl or aryl. Exemplary metallocene compounds of this type include, but are not limited to, (μ-dimethylsilyl)bis(2-methyl-4-(3,'5'-di-tert-butylphenyl)indenyl)zirconiumdimethyl, (μ-dimethylsilyl)bis(2-methyl-4-(3,'5'-di-tert-butylphenyl)indenyl)hafniumdimethyl, (μ-dimethylsilyl)bis(2-methyl-4-naphthylindenyl)zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)zirconiumdimethyl, and (μ-dimethylsilyl)bis(2-methyl-4-(N-carbazyl)indenyl)hafniumdimethyl.

Alternatively, in one or more embodiments of the present invention, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f) indenyl)zirconium dichloride, and cyclo-propylsilyl bis(2-(methyl)-5,5,8,8-tetramethyl-5,6,7,8-tetrahydrobenz(f) indenyl)hafnium dimethyl.

In one or more embodiments of the present invention, the activators of the catalyst systems used to produce semi-crystalline polymers comprise a cationic component. In some embodiments, the cationic component has the formula $[R^1R^2R^3AH]^+$, where A is nitrogen, $R^1$ and $R^2$ are together a $-(CH_2)_a-$ group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. In other embodiments, the cationic component has the formula $[RnAH]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

In one or more embodiments of the present invention, the activators of the catalyst systems used to produce the semi-crystalline polymers comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments of the present invention, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Suitable activators for the processes of the present invention also include alominoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x(R^x-Al-O)_nAlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In one or more embodiments, $R^x$ is methyl and n is at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In some embodiments of the invention, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, IV is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

In some embodiments, the catalyst system used to produce the semi-crystalline polymers comprises a transition metal component which is a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In_1$ and $In_2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl.

Solvent

The solvent mixed with the semi-crystalline polymer and fed to the devolatilizing device may be any non-polymeric species capable of being removed from the semi-crystalline polymer composition by heating to a temperature below the decomposition temperature of the polymer and/or reducing the pressure of the solvent/polymer mixture. In one or more embodiments, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 50, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. The optimal amount of solvent used in combination with the semi-crystalline polymer will generally be dependent upon the desired temperature change of the polymer melt within the devolatilizer, and can be readily determined by persons of skill in the art. For example, the polymer composition may comprise from about 1 wt % to about 50 wt % solvent, or from about 5 wt % to about 45 wt % solvent, or from about 10 wt % to about 40 wt % solvent, or from about 10 wt % to about 35 wt % solvent.

Devolatilizing Apparatus

Devolatilizing devices are known in the art. Any such device capable of removing solvent from a polymer melt to achieve the evaporative cooling described herein may be used. Certain of those devices are described in more detail below.

In one or more embodiments, devolatilizing devices suitable for use in the present invention generally comprise a vacuum chamber having an inlet for a polymer melt, an outlet for a polymer melt, a vacuum port through which volatiles may be removed and a stirrer shaft port for the entry of a stirrer shaft. The stirrer shaft passes through the at least one stirrer shaft port and extends into the vacuum chamber and carries an agitation means, such as paddles. The stirrer shaft seal is associated with each stirrer shaft port for sealing against the stirrer shaft and each stirrer shaft seal has an external portion outside the vacuum chamber. The devolatilizer is provided with a motor located outside of the vacuum chamber for rotating shaft and comprises means for blanketing the external portion of the stirrer shaft seal with a low oxygen content gas or vapor, e.g., nitrogen, helium, steam, or carbon dioxide.

The inlet to and outlet from the vacuum chamber are for the entry of the concentrated polymer phase into and exit of polymer from the vacuum chamber. The agitation means provides agitation of the concentrated polymer phase in the vacuum chamber. The agitation means includes any conventional agitation apparatus known to those skilled in the art. For example, agitation means include one or more: conventional circular or elliptical paddles, conventional blades, conventional rods, or combinations thereof.

The devolatilizer may also comprise a screw shaft associated with the outlet from the vacuum chamber for driving the polymer through the outlet. In that case the vacuum chamber will also have a screw shaft port through which the screw shaft passes into the chamber, and that screw shaft port will also include a screw shaft seal having an external portion outside of the vacuum chamber. Preferably, the devolatilizer also comprises means, such as an enclosure supplied with a low oxygen content gas, for blanketing the external portion of the screw shaft seal with the low oxygen content gas.

The external portion of the stirrer or screw shaft seal is the part of the stirrer or screw shaft seal which is exposed to the atmosphere on the outside of the vacuum chamber. In operation of the devolatilizer of the first aspect of the disclosure, that atmosphere is an atmosphere of a low oxygen content gas.

In one embodiment, the devolatilizer vacuum chamber has two stirrer shaft ports and the stirrer shaft extends through each of those two stirrer shaft ports. In that embodiment, the stirrer shaft typically extends all the way through the chamber. In another embodiment, the vacuum chamber has only one stirrer shaft port and the stirrer shaft extends only partway through the chamber. Any suitable means for blanketing the external portion of each shaft seal with a low oxygen content gas may be used, including a stream of inert gas directed onto the external portion of the seal. Optionally, the means for blanketing the outer face of each shaft seal with a low oxygen content gas is an enclosure around each shaft seal, the enclosure being mounted on the outside of the chamber and being provided with a supply of low oxygen content gas. The enclosure may be fastened to the exterior of the vacuum chamber in any suitable way.

Optionally, in use of the devolatilizer, each enclosure may be maintained under a positive pressure of a low oxygen content gas. In that way, leaks of air into the enclosure are prevented.

Optionally, each stirrer shaft motor comprises a housing and the housing forms part of an enclosure. Optionally, the stirrer shaft has two motors, each motor being arranged at a respective end of the stirrer shaft, and both motors have a housing, each housing forming part of an enclosure. Where the devolatilizer comprises a screw shaft, the screw shaft will be driven by a motor and the motor optionally comprises a housing that forms part of an enclosure.

Typically, the vacuum chamber is generally cylindrical and is horizontal such that the axis of the cylinder lies in a horizontal plane, and the stirrer shaft also extends horizontally and optionally coincides with axis of the cylinder.

Optionally, each shaft seal is a packed seal and the devolatilizer comprises at least one oil injection pump for injecting lubricating oil into the packed seal. Optionally, the devolatilizer comprises at least one reservoir of lubricating oil for the oil injection pumps. Optionally, the reservoir contains a food grade oil, such as a food grade Royal Purple™ oil.

Optionally, each seal is packed with a packing comprising Kevlar™ fibers (or poly para-phenyleneterephthalamide fibers), PTFE (polytetrafluoroethylene) and graphite. Optionally, each seal is packed with a packing comprising Kevlar or graphite impregnated with PTFE.

The provided apparatus and process use any suitable low oxygen content gas. Preferably, the low oxygen content gas has less than 3 wt % oxygen, preferably less than 0.5 wt % oxygen. More preferably, the low oxygen content gas is substantially free or free (0.0 wt %) of oxygen. Low oxygen content gases include conventional gases that do not contain oxygen, such as helium, argon, nitrogen, steam, carbon dioxide, or combinations thereof. Preferably, the low oxygen content gas is nitrogen.

Optionally, the internal volume of the vacuum chamber is at least 2 $m^3$, for example, at least 4 $m^3$ and is optionally at most 15 $m^3$, for example 11 $m^3$. Optionally, the vacuum chamber is generally cylindrical with a length of at least 4 m, optionally at least 6 m, and a diameter of at least 1 m.

Typically, the vacuum devolatilizer comprises or is connected to at least one pump for applying a vacuum to the vacuum chamber via the vacuum port or vacuum ports.

The devolatilizer may also comprise a screw shaft associated with the outlet from the vacuum chamber for driving the polymer through the outlet. In that case, the vacuum chamber will also have a screw shaft port through which the screw shaft passes into the chamber, and the screw shaft port will also include a screw shaft seal having an external portion outside of the vacuum chamber. Preferably, the devolatilizer also comprises means, such as an enclosure supplied with low oxygen content gas, for blanketing the external portion of the screw shaft seal with a low oxygen content gas.

FIG. 1 shows the arrangement of an exemplary devolatilizer 100 suitable for use in the inventive processes and systems. The devolatilizer 100 includes a vacuum chamber 101 which is provided with an inlet 102 for a polymer composition comprising polymer and solvent, an outlet 103 for polymer flowing to the pelletizer 200 (not shown in FIG. 1) and two vacuum ports 104 and 105 which are connected via conduits (not shown) to a vacuum system comprising a pump. The vacuum chamber 101 is generally cylindrical and may have a length of approximately 2 to 10 meters and a diameter of over 1 meter. The vacuum chamber 101 is horizontally mounted and is provided at each end with a stirrer shaft port 106, 107. Stirrer shaft 108 extends horizontally through the stirrer shaft ports 106, 107 and is coaxial with the axis of the cylindrical vacuum chamber 101. Stirrer shaft port 106 is provided with a stirrer shaft seal 109 for sealing between the vacuum chamber 101 and the stirrer shaft 108. Stirrer shaft port 107 is provided with a similar stirrer shaft seal 110. The function of stirrer shaft seals 109 and 110 is to prevent ingress of the atmosphere external to the vacuum chamber 101 into the interior vacuum chamber 101. The vacuum devolatilizer 100 further includes two hydraulic motors 111, 112 mounted at the ends of the stirrer shaft 108 for driving the stirrer shaft 108. Those motors 111, 112 are powered by separate hydraulic drives 113 and 114, respectively. Stirrer shaft 108 is provided along its length with a number of paddles 115 for agitating the polymer inside the vacuum chamber 101.

At the end of the vacuum chamber 101 remote from the inlet 102 a horizontally mounted screw shaft 116 is mounted orthogonal to the stirrer shaft 108 (in FIG. 1 the screw shaft appears in a vertical direction for clarity). Screw shaft 116 is driven by hydraulic motor 117, which is powered by hydraulic drive 114. The function of screw shaft 116 is to drive polymer out of the vacuum chamber 101 and through the outlet 103 towards the downstream pelletizer. The screw shaft 116 enters the vacuum chamber through a screw shaft port 118, which is provided with a screw shaft seal 119.

Seal 109 has a portion 109a that extends outside the vacuum chamber 101. The external portion 109a of the seal 109 is contained within enclosure 120, which is a cylindrical enclosure extending from the end of the vacuum chamber 101 to the housing of the motor 111. When the devolatilizer 100 is in operation, the enclosure 120 is supplied with nitrogen from a nitrogen source (not shown) to maintain an inert atmosphere within the enclosure 120, thereby blanketing the external portion 109a of the seal 109 with the inert atmosphere. In that way, any leak in seal 109 draws nitrogen from the interior enclosure 120 into the interior of the vacuum chamber 101 rather than air from the atmosphere. The nitrogen supply to enclosure 120 may be monitored by a monitor (not shown) so that any sudden rises of nitrogen flow out of the enclosure 120 will be detected as an indication of a possible leak in the seal 109. In a similar way, stirrer shaft seal 110 has a portion that extends external to the vacuum chamber 101, which is enclosed inside nitrogen-filled enclosure 121, and the screw shaft seal 119 has a portion that extends external to the vacuum chamber 101 that is enclosed inside nitrogen-filled enclosure 122. Enclosures 121 and 122 have their own independent supplies of nitrogen (not shown) with their own independent monitors for detecting any increase in the flow of nitrogen to those enclosures.

As can be seen from FIG. 1, each of the motors 111, 112, and 117 has a housing that forms part of the enclosures 120, 121, and 122, respectively.

Seal 109 is provided with a dedicated oil injection pump 123 that feeds lubricant oil into the seal 109, thereby improving the sealing action and extending the lifetime of the seal packing. Pump 123 is an air driven plunger pump which meters an exact quantity of oil to the seal for each stroke thereby ensuring that excessive oil is not injected into the seal. Oil flow is carefully controlled to limit the ingress of seal oil into certain polymers that may be used for making packaging materials for foods. Alternately, the oil may be pressurized with nitrogen supply 124 that applies a pressure to a reservoir of lubricant oil thereby forcing the oil at a specified pressure into the seal 109.

In a similar way seal 110 is provided with an oil pump 125 and an associated air supply or nitrogen supply 126, and seal 119 is provided with an oil pump 127 having an associated nitrogen supply 128.

During operation of the devolatilizer 100 a polymer composition comprising a semi-crystalline polymer and a solvent flows into inlet 102 of vacuum chamber 101. Inside the vacuum chamber the polymer composition is agitated by the paddles 115 fixed to stirrer shaft 108, which may rotate at a speed of, for example, between 20 and 45 rpm. The agitation continuously exposes new surface of the polymer inside the vacuum chamber 101 and volatile solvent material is drawn off through the two vacuum ports 104, 105 toward the vacuum system (not shown), the vacuum is maintained inside the vacuum chamber 101 at a pressure of approximately 20 mmHg. The polymer flows along the length of the vacuum chamber 101 and is driven out of the end of vacuum chamber 101 by rotating screw shaft 116 through outlet 103 towards the downstream pelletizer 200.

Further embodiments and a more detailed description of the operation of devolatilizing devices suitable for use herein may be found in U.S. patent Ser. No. 12/972,140, which is incorporated by reference herein in its entirety. Suitable devolatilizing devices are available commercially from, for example, LIST USA, Inc.

Pelletizer

In one or more embodiments, the cooled polymer may be pelletized as it exits the devolatilizer. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art. Examples of useful underwater pelletizing devices can be found in U.S. Pat. Nos. 7,033,152; 7,226,553; and 7,470,118, all of which are incorporated herein by reference.

In one or more embodiments, an underwater pelletizer is used to pelletize the cooled polymer. The polymer is extruded through a pelletizing die to form strands. The strands are then cut by rotating cutter blades in the water box of the underwater pelletizer. Water continuously flows through the water box to further cool and solidify the pellets and carry the pellets out of the underwater pelletizer's water box for further processing.

In one embodiment, the pelletizing die is thermally regulated by means known to those skilled in the art in order to prevent die hole freeze-off. In some embodiments, the underwater pelletizer uses chilled water, thus allowing for further rapid cooling of the pellets and solidification of the outermost layer of the pellets. In an embodiment, the temperature of the water in the underwater pelletizing unit may be from about 0° C. to 25° C. Preferably a water chilling system cools the water going to the underwater pelletizer water box (cutting chamber) to about 5° C.

In an embodiment, the underwater pelletizer unit has a chilled water slurry circulation loop. The chilled water helps eliminate the tendency of the pellets to stick together and allows the extruded polymer strands to be more cleanly cut. The chilled water slurry circulation loop extends from the underwater pelletizer, carrying the pellet-water slurry to a pellet drying unit, and then recycles the water back to the underwater pelletizer.

In some embodiments, the residence time of the pellets in the chilled water slurry circulation loop is at least 10 seconds, or at least 20 seconds, or at least 30 seconds, or at least 40 seconds, or at least 50 seconds or more. Because fresh pellets may have a tendency to bridge and agglomerate if the pellets have not had adequate time to crystallize and harden, it is preferred that the pellets have sufficient residence time in the pellet water loop.

In the same or other embodiments, chilled water removes the pellets from the cutter blade and transports them through a screen that catches and removes coarsely aggregated or agglomerated pellets. The water may then transport the pellets through a dewatering device and into a centrifugal dryer or fluidized bed to remove excess surface moisture from the pellets. The pellets may then pass through a discharge chute for collection or may proceed to additional processing including which can include pellet coating, crystallization, or further cooling as required to achieve the desired product.

The pelletizing die can be used to make pellets in shapes not limited to spheres, rods, slats, or polygons. Preferably, near spherical pellets are made. A pellet shape that will allow the pellets to easily flow is preferred.

The speed at which the pelletizer operates is selected according to the die plate size, number of orifices in the die, and the desired pellet size and shape. The number of orifices in the die and the orifice geometry are selected as appropriate for the polymer feed flow rate and melt material and such determinations are within the knowledge and capabilities of those skilled in the art.

Optionally, an antiblocking agent may be added to the water in the underwater pelletizing water box or chilled water slurry loop. The addition of an antiblock to the pellet water loop is useful to prevent pellets from sticking together in the loop.

The temperature of the water, the rotation rate of the cutter blades, and the flow rate of the polymer melt through the pelletizing die all contribute to the production of proper pellet geometries. Additionally, the temperature of the pellets, both in the interior and the exterior, also influence the formation of the pellets as well as the drying of the pellets.

Incomplete crystallization of the polymer material in the pellets after the pellets have exited the pellet-water slurry loop can lead to poor pellet geometry, pellet deformation, and reduced ability of the pellets to freely flow. The degree of crystallization of the pellets is affected by residence time and temperature of the pellets. Additionally, the pellet hardness varies with residence time and temperature.

FIG. 2 shows the arrangement of an exemplary pelletizer system suitable for use in the inventive processes and systems. Cooled polymer exits the devolatilizer through outlet 103 and travels into an underwater pelletizer 200. Optionally, the polymer feed may travel through diverter valve 201 before entering the underwater pelletizer 200. The diverter valve 201 can be used to divert the polymer feed from the cooling/pelletizing processing line to be recirculated or purged/discharged from the apparatus. This can be particularly useful when cleaning the cooling/pelletizing processing line.

The underwater pelletizer 200 cuts the cooled polymer feed to form pellets. The pellets then travel in a pellet-water slurry from the underwater pelletizer 200 through conduit 202 into catch screen 203. Catch screen 203 can be used to collect agglomerated pellets. The pellet-water slurry then travels through conduit 204 into the centrifugal drier 205, where the pellets are separated from the water and dried. In an alternate embodiment, there is no catch screen 203 or conduit 204 and the pellet-water slurry travels directly from the underwater pelletizer 200 through conduit 202 directly into the centrifugal drier 205.

The dried pellets then exit the centrifugal drier 205 through conduit 206, where they can proceed for further processing or be collected and packaged. The water separated from the pellets in the centrifugal drier 205 can then travel through conduit 207 into water storage tank 208, to be recycled back into the underwater pelletizer 200.

The water in the underwater pelletizer 200 is supplied from water storage tank 208. Water flows from the storage tank 208 through conduit 209 into a water cooler 210. Then the cooled water travels through conduit 211 into the underwater pelletizer 200. Alternatively, there is no water cooler 210 and water flows directly from the storage tank 208 through conduit 209 into the underwater pelletizer 200. Optionally, anti-block additives may be added into the water in the water storage tank 208 through conduit 212.

The first crystallization temperature (Tc1) is determined using the curve of log of complex viscosity plotted against temperature (as measured by ARES dynamic mechanical spectrometer operating at small amplitude oscillatory shear (SAOS) at a frequency of 10 rad/s, with a strain of 20% under a nitrogen atmosphere, parallel plates requiring a sample 25 mm in diameter and 1 mm thick, and a cooling rate of 5° C./min) over a range of temperatures. Tc1 is the approximate temperature at which the onset of crystallinity occurs wherein Tc1 is greater than Tc2 but less than Tm. Tc1 is the temperature below the Tm wherein the first substantial and noticeable rise in slope occurs on the log (complex viscosity) versus temperature curve when moving from right to left on the curve. Tc1 can be pinpointed by a trial and error approach using linear regression of the curve wherein a tangent trend line is inserted from Tc1 to Tc1−5° C. on one side of the slope change and from Tc1 to Tc1+5° C. on the other side of the slope change such that the two trend lines are positioned on the curve such that the highest possible coefficient of determination ($r^2$) for each trend line is achieved wherein $r^2$ is defined in Everitt, B. S. (2002). *Cambridge Dictionary of Statistics* (2nd Edition). Tc1 is specifically identified as the intersection of the two trend lines. Examples identifying Tc1 can be found in FIG. 3a (Tc1=87° C.), FIG. 3b (Tc1=40° C.), and FIG. 3c (Tc1=58° C.).

Peak melting point (Tm), also referred to as melting point, peak crystallization temperature, (Tc2), herein referred to as the second crystallization temperature, glass transition temperature (Tg), heat of fusion (ΔHf or Hf), and percent crystallinity were determined using the following differential scanning calorimetric (DSC) procedure according to ASTM D3418-03. DSC data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the first heating/cooling cycle unless otherwise noted.

Further embodiments and a more detailed description of the operation of underwater pelletizing systems suitable for use herein may be found in U.S. Patent Application Publication No. 2009/0121372, which is incorporated by reference herein in its entirety.

Examples

Figure 3A:
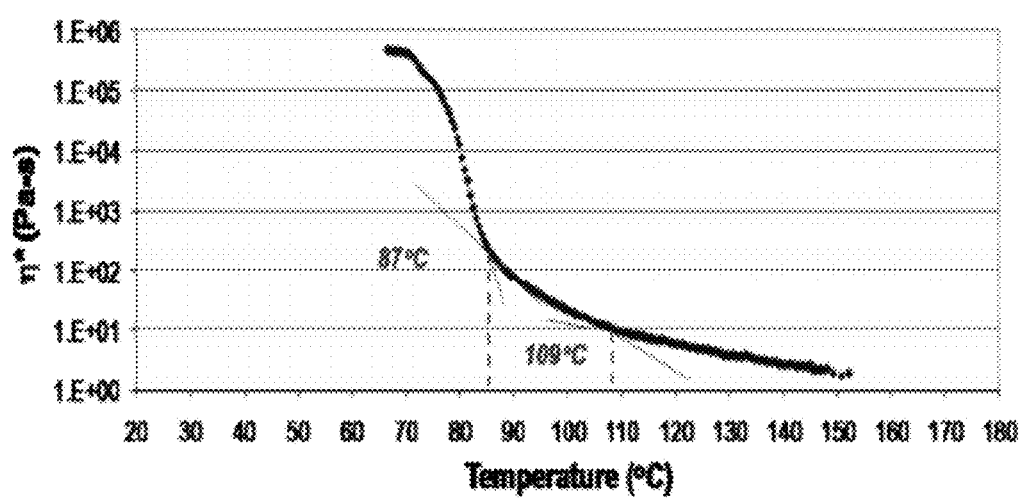
FIGS. 3a through 3c depict viscosity as a function of temperature for three exemplary semi-crystalline polymers.
Figure 3B:
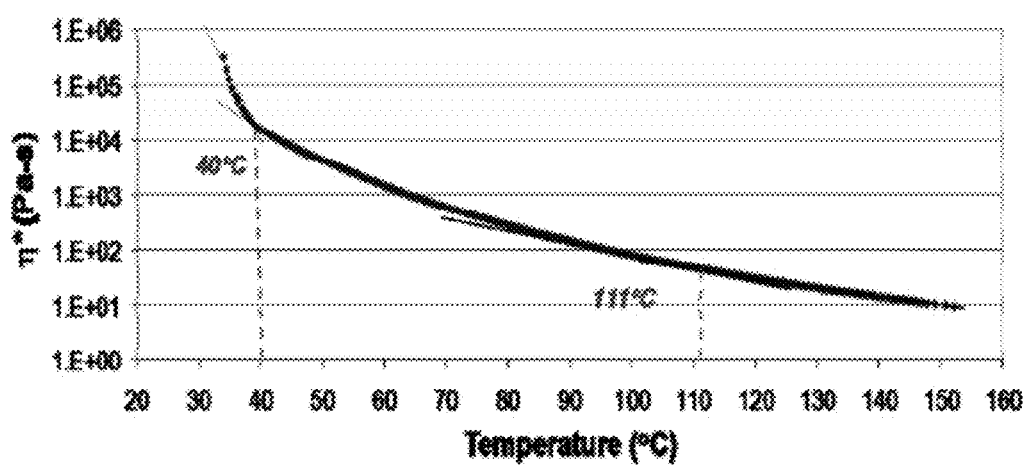
Figure 3C:
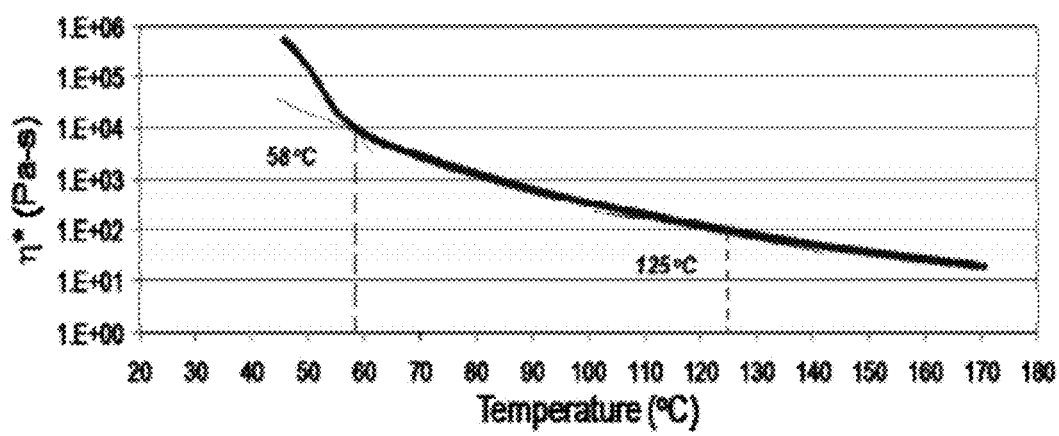

Three exemplary propylene-hexene semi-crystalline polymers, identified as Polymers A, B, and C were cooled and pelletized as described above. FIGS. 3a, 3b, and 3c show the viscosity of the three materials as a function of temperature. In each figure, lines are drawn along the corresponding curve to indicate the temperature at which the material begins to crystallize as well as the first crystallization temperature Tc1, where there is a significant change in slope. These temperatures, along with the measured crystallization half-times of the materials, were used to frame the desired temperature of the polymer at the exit of the devolatilization device (Tf) as well as the temperature of the pelletization die (Td).

Figure 4A:
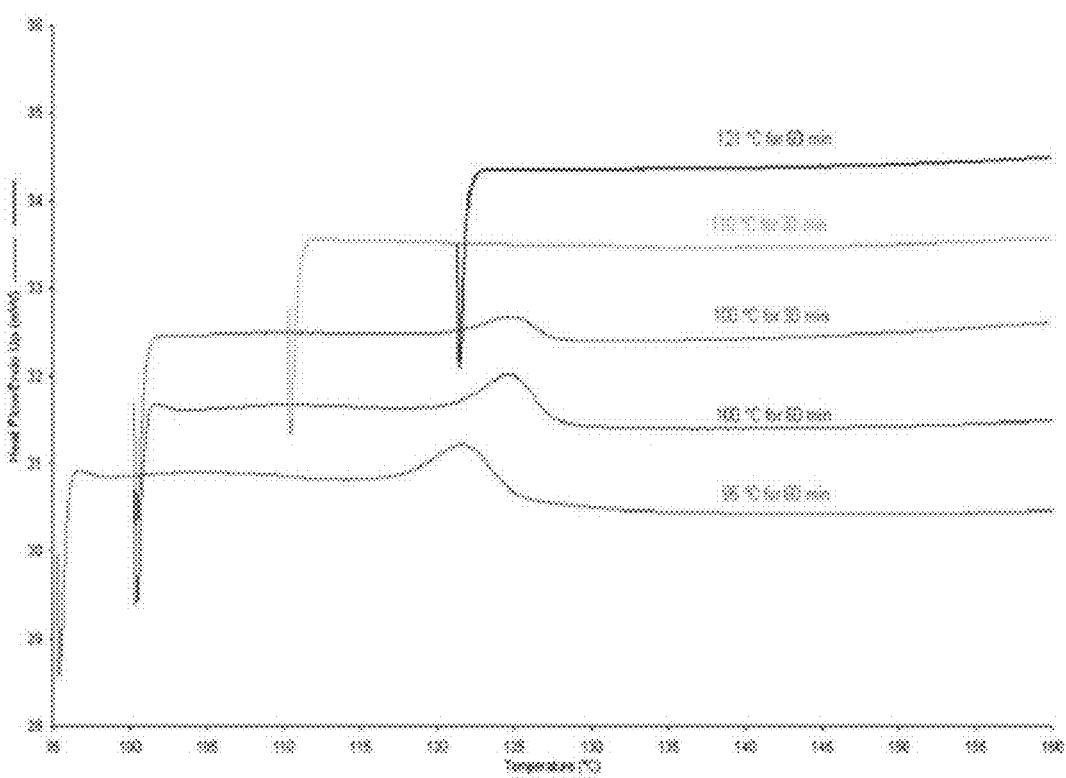
FIGS. 4a through 4c show differential scanning calorimetry (DSC) curves for the three exemplary semi-crystalline polymers.
Figure 4B:
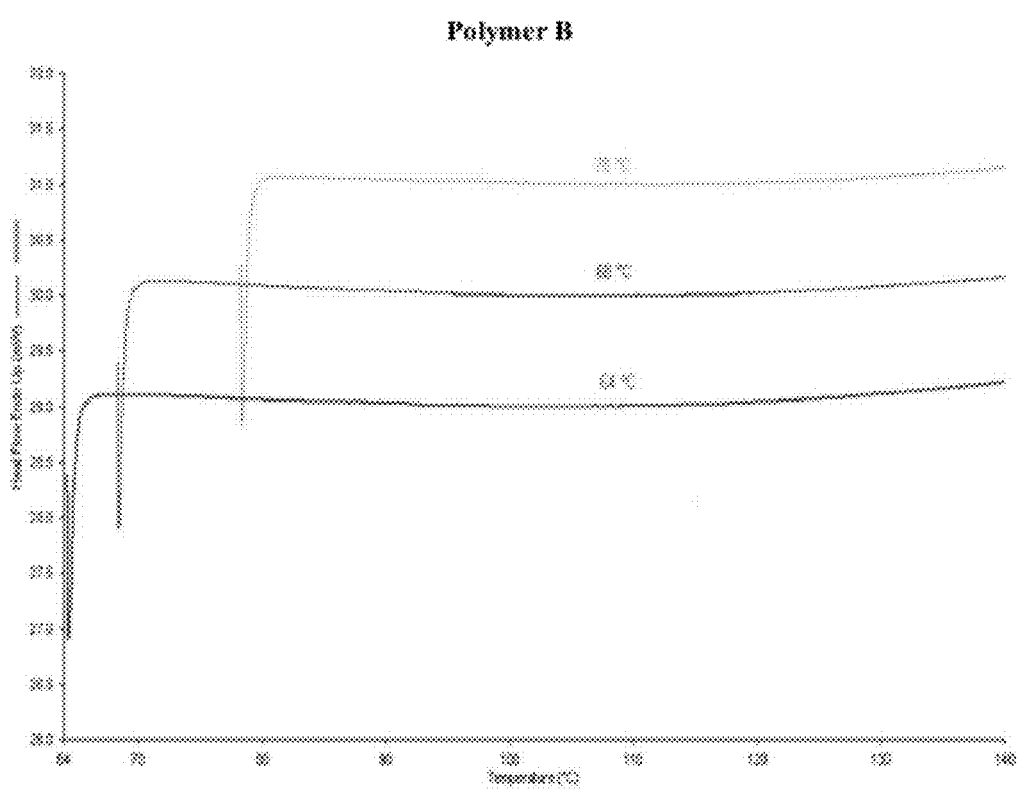
Figure 4C:
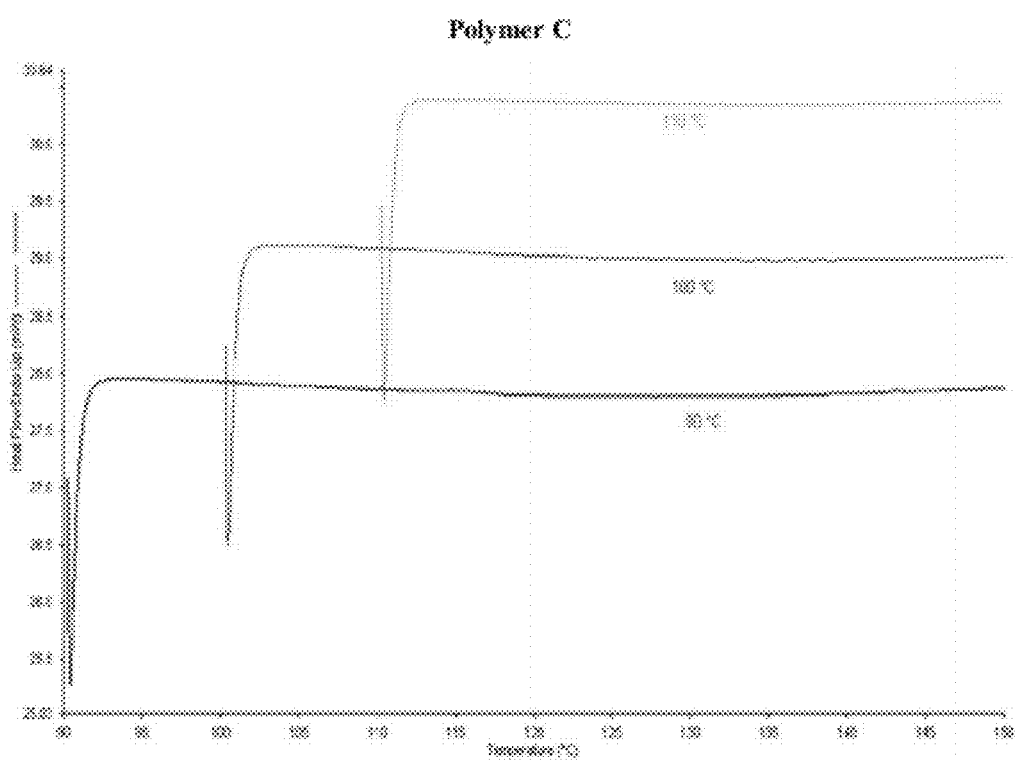

FIGS. 4a, 4b, and 4c are differential scanning calorimetry (DSC) melting curves for each of the exemplary semi-crystalline polymers. Heating was conducted at 10° C. per minute after holding at the specified temperatures and times.

Polymer A, B, and C are a propylene-hexene copolymer having the approximate properties as set forth in Table 1.

TABLE 1

|  | Polymer A | Polymer B | Polymer C |
|---|---|---|---|
| Propylene Content (wt %) | 90 | 90 | 90 |
| Hexene Content (wt %) | 10 | 10 | 10 |
| Crystallization Temperature (Tc1) in ° C. (Complex Viscosity Curve) | 87 | 40 | 58 |
| Crystallization Temperature (Tc2) in ° C. (DSC) | 45 | 28 | 17 |
| Pelletization Die Temperature (Td) | 87 | | |
| Melting Temperature (Tm) in ° C. | 125 | 75 | 95 |
| Heat of Fusion (Hf) in Joules/gram | 42 | 25 | 15 |
| Viscosity at 190° C. (cP) | 900 | 3,000 | 13,500 |
| Mw | 30,000 | 50,000 | 60,000 |

Figure 5A:
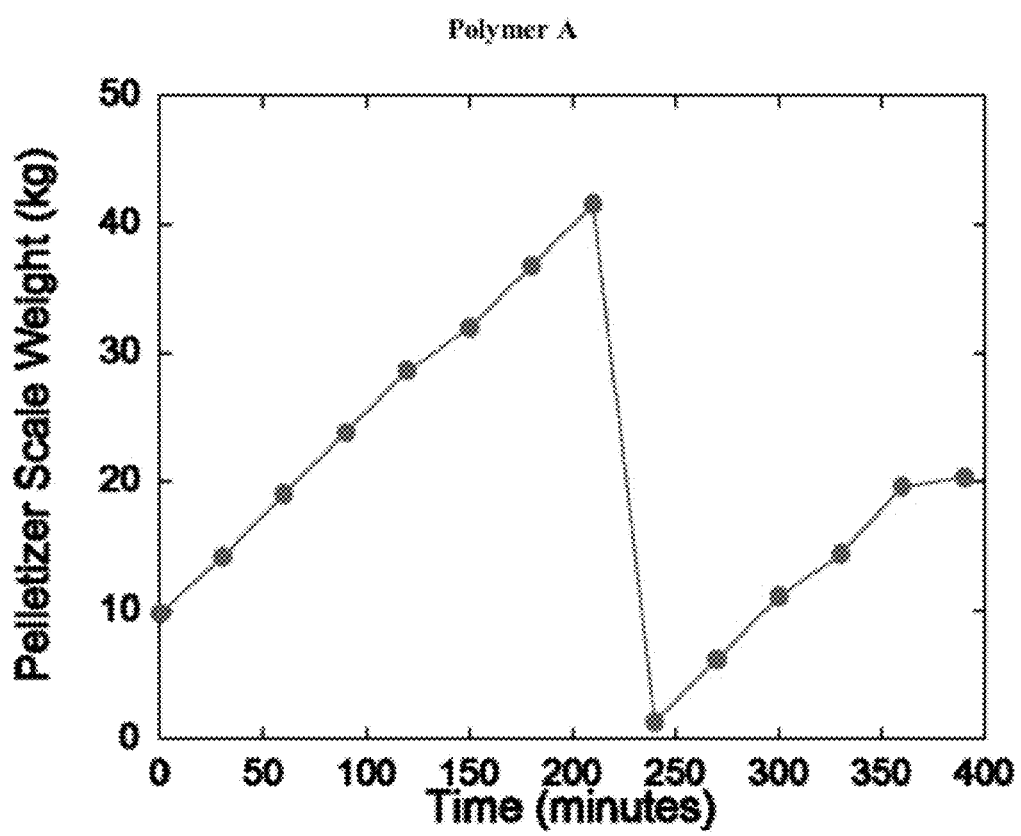
FIGS. 5a through 5c are plots of pelletizer scale weight as a function of time for each of the three exemplary semi-crystalline polymers.
Figure 5B:
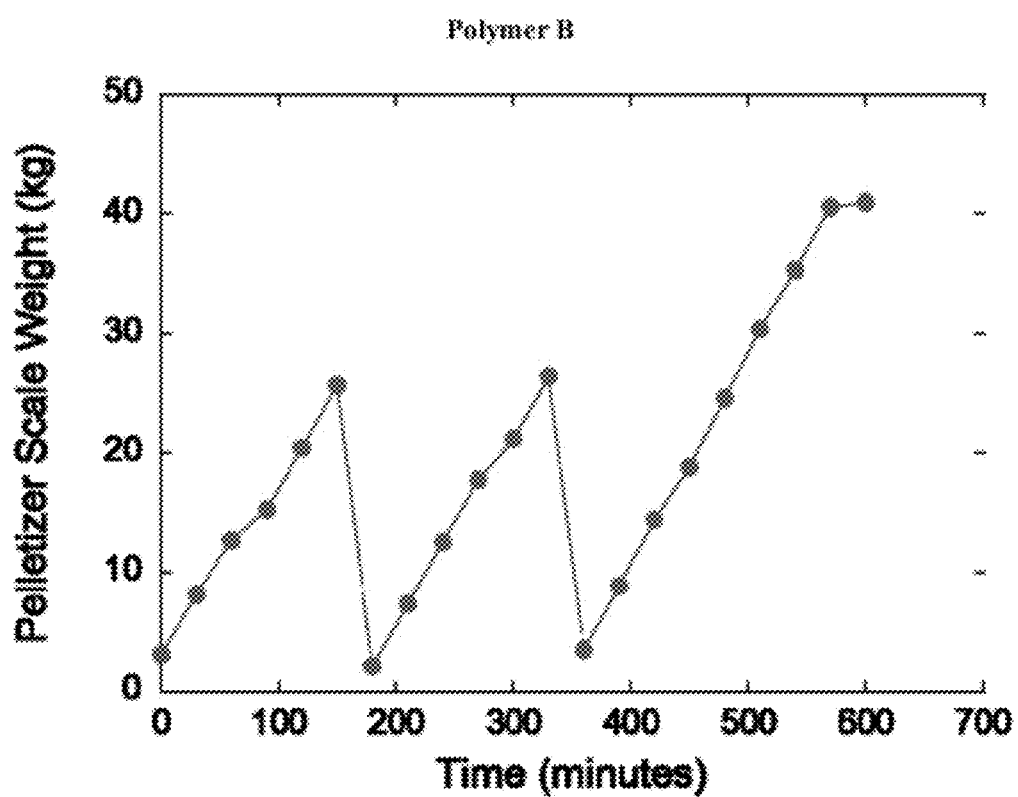
Figure 5C:
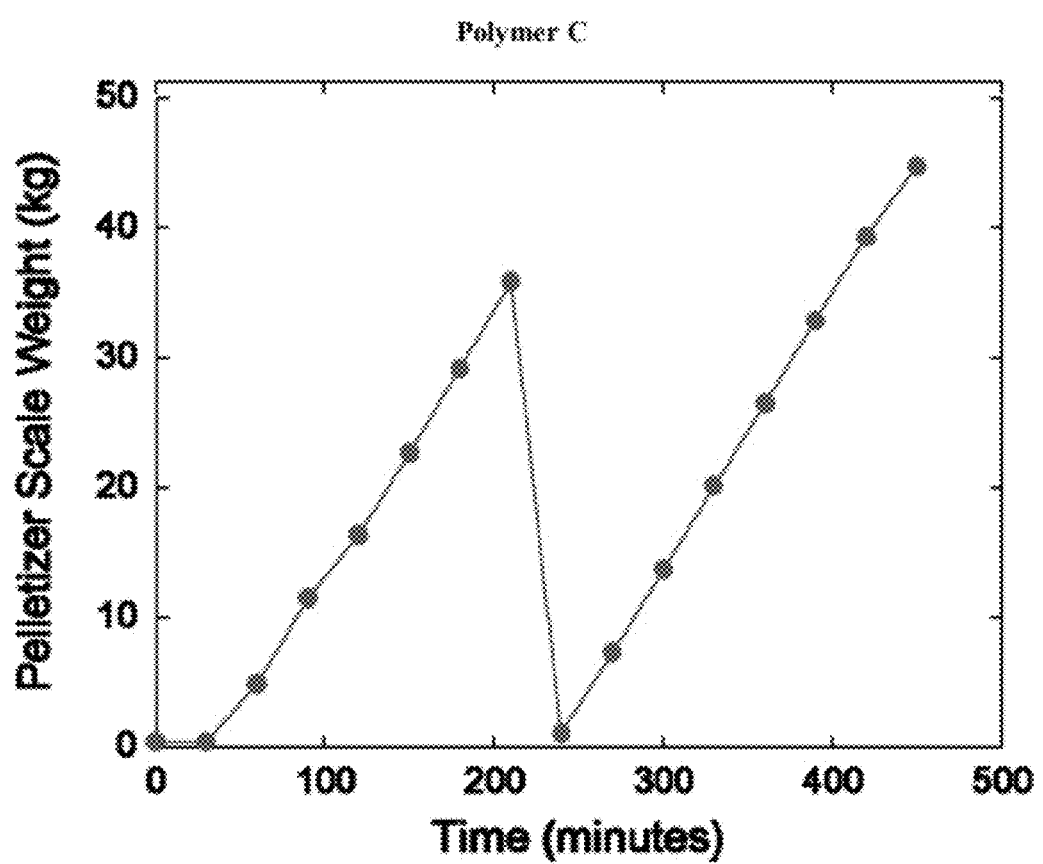

The exemplary polymer/solvent blends were cooled and the solvent removed in a devolatilizer as described above. The polymers were then pelletized. FIGS. 5a, 5b, and 5c are plots of the pelletizer scale weight as a function of time for each of Polymers A, B, and C which indicates relatively consistent feed to the pelletizer throughout. While the cooling achieved by the devolatilizer was sufficient to enable pelletization for all three of the exemplary polymers it was found that the most preferred pelletization occurred at Tf≤Tc1+60. The resetting of the weight to zero in FIGS. 5a, 5b, and 5c was a result of periodically emptying the scale.

For Polymer A, the Tf (measured at the final zone of the LIST) was operated at approximately 105° C.; and for Polymer B, the Tf was operated at approximately from 60° C. to 110° C.; and for Polymer C, the Tf was operating at approximately from 95° C. to 130° C. It was found that outlet temperatures of the LIST that was greater than 60° C. from Tc1 produced inadequate pelletization in the downstream pelletization process.

Having described the various aspects of the compositions herein, further specific embodiments of the invention include those set forth in the following lettered paragraphs:

A. A process for pelletizing a semi-crystalline polymer, the process comprising: a.) providing a vessel having an inlet and an outlet; b.) introducing a first polymer composition comprising a semi-crystalline polymer and a solvent into the inlet of the vessel; c.) subjecting the first polymer composition to a vacuum in the vessel such that at least a portion of the solvent is removed from the first polymer composition and the temperature of the first polymer composition is reduced, forming a second polymer composition comprising the semi-crystalline polymer and having a lower solvent content and a lower temperature than the first polymer composition; d.) discharging the second polymer composition from the outlet of the vessel; e.) feeding the second polymer composition to a pelletizer; and f.) discharging a pelletized polymer product from the pelletizer, wherein the second polymer composition comprises less than or equal to about 1 wt % solvent, and the relationship between the temperature of the second polymer composition at the outlet of the vessel (Tf) and the first crystallization temperature of the semi-crystalline polymer (Tc1) satisfies the formula Tf≤Tc1+60 wherein Tf and Tc1 are in degrees celcius.

B. The process of paragraph A, wherein the semi-crystalline polymer has a melting point of greater than 30° C. and a heat of fusion greater than 5 J/g and less than about 70 J/g.

C. The process of any of the preceding paragraphs, wherein the semi-crystalline polymer has viscosity at 190° C. of less than 20,000 cP.

D. The process of any of the preceding paragraphs, wherein the pelletizer comprises a pelletization die and wherein the pelletization die temperature (Td) satisfies the formula Tc1−30≤Td≤Tc1+30 wherein Td is in degrees celcius.

E. The process of any of the preceding paragraphs, wherein the semi-crystalline polymer has an Mw from about 10,000 to about 200,000.

F. The process of any of the preceding paragraphs, wherein the second polymer composition has a viscosity from about 5,000 to about 500,000 cP.

G. The process of any of the preceding paragraphs, wherein the relationship between the temperature of the second polymer composition at the outlet of the vessel (Tf) and the crystallization temperature of the first semi-crystalline polymer (Tc1) satisfies the formula Tc1−30≤Tf≤Tc1+60 or Tc1≤Tf≤Tc1+60.

H. The process of any of the preceding paragraphs, wherein the vessel further comprises:
   a. at least one vacuum port and at least one stirrer shaft port;
   b. a stirrer shaft passing through the at least one stirrer shaft port, wherein the stirrer shaft has an external portion outside of the vessel and an internal portion extending into the vessel, the internal portion of the stirrer shaft comprising an agitating means;
   c. a stirrer shaft seal associated with each stirrer shaft port for sealing against the stirrer shaft; and
   d. at least one motor located outside the vessel for rotating the stirrer shaft.

I. A system for pelletizing a polymer composition comprising: a.) a vessel having a polymer inlet for introducing a first polymer composition to the vessel and a polymer outlet for discharging a second polymer composition; b.) a devolatilizing region within the vessel having a solvent outlet for removing solvent from the first polymer composition to form the second polymer composition; c.) a stirrer shaft passing longitudinally through the vessel for agitating the contents of the vessel; d.) a motor located outside the vessel for rotating the stirrer shaft; and e.) a pelletizer for pelletizing the second polymer composition upon exiting the vessel; wherein the first polymer composition comprises a semi-crystalline polymer and a solvent, the second polymer composition comprises the semi-crystalline polymer and less than 1 wt % solvent, the temperature of the second polymer composition at the outlet of the vessel is lower than the temperature of the first polymer composition at the inlet of the vessel, and the conditions within the devolatilizing region of the vessel are such that a vacuum is maintained to facilitate removal of at least a portion of the solvent from the first polymer composition by evaporation.

J. The system of paragraph I, wherein the temperature of the second polymer composition at the outlet of the vessel is at least about 10° C. lower than the temperature of the first polymer composition at the inlet of the vessel.

K. The system of any of paragraphs I through J, further comprising a polymer discharge screw located between the polymer outlet of the vessel and the pelletizer.

L. The system of any of paragraphs I through K, wherein the pelletizer is an underwater pelletizer.

M. The system of any of paragraphs I through L, wherein the relationship between the temperature of the second polymer composition at the outlet of the vessel (Tf) and the crystallization temperature of the semi-crystalline polymer (Tc1) satisfies the formula Tf≤Tc1+60.

N. The system of any of paragraphs I through M, wherein the relationship between the temperature of the second polymer composition at the outlet of the vessel (Tf) and the first crystallization temperature of the semi-crystalline polymer (Tc1) satisfies the formula Tc1−30≤Tf≤Tc1+60 or Tc1≤Tf≤Tc1+60.

O. The system of any of paragraphs I through N, wherein the semi-crystalline polymer has an Mw from about 10,000 to about 200,000.

P. The system of any of paragraphs I through O, wherein the heat of fusion of the semi-crystalline polymer is from about 5 to about 70 J/g.

Q. The system of any of paragraphs I through P, wherein the semi-crystalline polymer comprises propylene.

R. A process for the production of polymer pellets comprising: a.) providing a devolatilizer having an inlet and an outlet; b.) comprising a semi-crystalline polymer and a solvent to the inlet of the devolatilizer; c.) conveying the polymer composition through the devolatilizer from the inlet to the outlet; d.) maintaining the temperature and pressure within the devolatilizer such that a vacuum is created sufficient to remove at least a portion of the solvent from the polymer composition by evaporation and such that the temperature of the polymer composition at the outlet of the devolatilizer is lower than the temperature of the polymer composition at the inlet of the devolatilizer; e.) removing the polymer composition from the outlet of the devolatilizer; and f.) pelletizing the polymer composition.

S. The process of paragraph R, wherein the relationship between the temperature of the polymer composition at the outlet of the vessel (Tf) and the first crystallization temperature of the semi-crystalline polymer (Tc1) satisfies the formula Tf≤Tc1+60.

T. The process of any of paragraphs R through S, wherein the temperature of the polymer composition at the outlet of the devolatilizer is at least about 10° C. lower than the temperature of the polymer composition at the inlet of the devolatilizer U. The process of any of paragraphs R through T, wherein the polymer composition at the outlet of the vessel comprises less than 1 wt % solvent.

V. The process of any of paragraphs R through U, wherein the polymer composition is pelletized in an underwater pelletizer.

W. The process of any of paragraphs R through V, wherein the semi-crystalline polymer comprises propylene and has an Mw from about 10,000 to about 200,000, a melting point from about 30° C. to about 110° C., and a heat of fusion from about 5 to about 70 J/g.

X. The process of any of paragraphs R through W, wherein the semi-crystalline polymer is a copolymer of propylene and ethylene, a copolymer of propylene and hexene, or a mixture thereof.

Y. The process of any of paragraphs R through X, wherein the viscosity of the polymer composition at the outlet of the devolatilizer is from about 5,000 to about 500,000 cP.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A process for pelletizing a semi-crystalline polymer, the process comprising:
   a. providing a vessel having an inlet and an outlet;
   b. introducing a first polymer composition comprising a semi-crystalline polymer and a solvent into the inlet of the vessel;
   c. subjecting the first polymer composition to a vacuum in the vessel such that at least a portion of the solvent is removed from the first polymer composition and the temperature of the first polymer composition is reduced, forming a second polymer composition comprising the semi-crystalline polymer and having a lower solvent content and a lower temperature than the first polymer composition;
   d. discharging the second polymer composition from the outlet of the vessel;
   e. feeding the second polymer composition to a pelletizer; and
   f. discharging a pelletized polymer product from the pelletizer,
   wherein the second polymer composition comprises less than or equal to about 1 wt % solvent, and the relationship between the temperature of the second polymer composition at the outlet of the vessel (Tf) and the first crystallization temperature of the semi-crystalline polymer (Tc1) satisfies the formula $Tf \leq Tc1+60$ wherein Tf and Tc1 are in degrees Celsius.

2. The process of claim 1, wherein the semi-crystalline polymer has a melting point of greater than 30° C. and a heat of fusion greater than 5 J/g and less than about 70 J/g.

3. The process of claim 1, wherein the semi-crystalline polymer has viscosity at 190° C. of less than 20,000 cP.

4. The process of claim 1, wherein the pelletizer comprises a pelletization die and wherein the pelletization die temperature (Td) satisfies the formula $Tc1-30 \leq Td \leq Tc1+30$ wherein Td is in degrees Celsius.

5. The process of claim 1, wherein the semi-crystalline polymer has an Mw from about 10,000 to about 200,000.

6. The process of claim 1, wherein the second polymer composition has a viscosity from about 5,000 to about 500,000 cP.

7. The process of claim 1, wherein the relationship between the temperature of the second polymer composition at the outlet of the vessel (Tf) and the crystallization temperature of the first semi-crystalline polymer (Tc1) satisfies the formula $Tc1-30 \leq Tf \leq Tc1+60$.

8. The process of claim 1, wherein the vessel further comprises:
   a. at least one vacuum port and at least one stirrer shaft port;
   b. a stirrer shaft passing through the at least one stirrer shaft port, wherein the stirrer shaft has an external portion outside of the vessel and an internal portion extending into the vessel, the internal portion of the stirrer shaft comprising an agitating means;
   c. a stirrer shaft seal associated with each stirrer shaft port for sealing against the stirrer shaft; and
   d. at least one motor located outside the vessel for rotating the stirrer shaft.

9. A process for the production of polymer pellets comprising:
   a. providing a devolatizer having an inlet and an outlet;
   b. providing a polymer composition comprising a semi-crystalline polymer and a solvent to the inlet of the devolatizer;
   c. conveying the polymer composition through the devolatizer from the inlet to the outlet;
   d. maintaining the temperature and pressure within the devolatizer such that a vacuum is created sufficient to remove at least a portion of the solvent from the polymer composition by evaporation and such that the temperature of the polymer composition at the outlet of the devolatizer is lower than the temperature of the polymer composition at the inlet of the devolatizer;
   e. removing the polymer composition from the outlet of the devolatizer; and
   f. pelletizing the polymer composition.

10. The process of claim 9, wherein the relationship between the temperature of the polymer composition at the outlet of the vessel (Tf) and the first crystallization temperature of the semi-crystalline polymer (Tc1) satisfies the formula $Tf \leq Tc1+60$.

11. The process of claim 9, wherein the temperature of the polymer composition at the outlet of the devolatizer is at least about 10° C. lower than the temperature of the polymer composition at the inlet of the devolatizer.

12. The process of claim 9, wherein the polymer composition at the outlet of the vessel comprises less than 1 wt % solvent.

13. The process of claim 9, wherein the polymer composition is pelletized in an underwater pelletizer.

14. The process of claim 9, wherein the semi-crystalline polymer comprises propylene and has an Mw from about 10,000 to about 200,000, a melting point from about 30° C. to about 110° C., and a heat of fusion from about 5 to about 70 J/g.

15. The process of claim 14, wherein the semi-crystalline polymer is a copolymer of propylene and ethylene, a copolymer of propylene and hexene, or a mixture thereof.

16. The process of claim 9, wherein the viscosity of the polymer composition at the outlet of the devolatizer is from about 5,000 to about 500,000 cP.

* * * * *